United States Patent [19]
Lowe et al.

[11] Patent Number: 4,680,590
[45] Date of Patent: Jul. 14, 1987

[54] POSITION FINDING SYSTEM

[75] Inventors: Eric Lowe, St Albans, England; Martin C. Poppe, Cambridge, Vt.; Andrew Stratton, Farnborough, England

[73] Assignee: Terrafix Limited, Welyn, England

[21] Appl. No.: 637,204

[22] Filed: Aug. 2, 1984

[30] Foreign Application Priority Data

Aug. 9, 1983 [EP] European Pat. Off. ......... 83304611.3

[51] Int. Cl.[4] ............................................... G01S 5/10
[52] U.S. Cl. .................................... 342/457; 342/396; 364/449
[58] Field of Search ........ 343/396, 457, 458, 463–465; 375/107; 455/51, 54; 364/443, 449, 571, 451, 452, 457, 458, 461; 342/387–397, 444, 450, 451, 457, 458, 463–465

[56] References Cited

U.S. PATENT DOCUMENTS

| | | | |
|---|---|---|---|
| 2,838,753 | 6/1958 | O'Brian et al. | 343/393 |
| 2,844,816 | 7/1958 | O'Brian et al. | 343/393 |
| 3,242,494 | 3/1966 | Gicca | 364/449 |
| 3,419,865 | 12/1968 | Chisholm | 343/457 |
| 3,715,758 | 2/1973 | Sender | 343/463 |
| 3,774,211 | 11/1973 | Nard et al. | 343/396 |
| 3,774,215 | 11/1973 | Reed | 343/458 |
| 4,232,317 | 11/1980 | Freeny, Jr. | 343/464 |
| 4,492,963 | 1/1985 | Scarlet et al. | 343/464 |

FOREIGN PATENT DOCUMENTS 2853317 6/1980 Fed. Rep. of Germany .
1321730 6/1973 United Kingdom .

OTHER PUBLICATIONS

"Automatic Differential Omega Receiver M6"; Sercel, Inc. (Washington, D.C.).

Primary Examiner—Theodore M. Blum
Assistant Examiner—Bernarr Earl Gregory
Attorney, Agent, or Firm—Robert F. O'Connell

[57] ABSTRACT

Three fixed reference stations having known positions comprise Omega receivers. Phase measurements made at all three stations are assembled at a master station, utilizing landlines or radio links and, using the known positions of the stations, a central processing unit calculates not merely the offset of the master station as measured from the true position but also the errors in the azimuths of the propagation directions of the received signals. The position measurement of a vehicle with an Omega receiver is corrected on the basis of the offset and also the errors in the said azimuths. Sufficient accuracy is achieved for finding the position of land based vehicles whose position may be calculated subject to the corrections in the master station on the basis of raw data transmitted to the master station over a link. Alternatively the azimuth corrections may be transmitted to the vehicle over the link. Two fixed stations suffice if they can measure absolute phase.

14 Claims, 4 Drawing Figures

POSITION FINDING SYSTEM

BACKGROUND OF THE INVENTION

1. Field of the Invention

The present invention relates to a position finding system of the type in which radio signals are transmitted from a plurality of transmitters to enable the position of mobile receivers to be determined.

2. Description of the Prior Art

Many position finding systems, especially navigation systems are known which operate by determining the relative times of arrival or relative phases of signals received from transmitter pairs, using at least three transmitters. As is well known, such systems establish sets of hyperbolae, one set for each transmitter pair and, providing steps are taken to resolve the ambiguity as to the "lane" in which the mobile receiver is, it is possible to obtain a fix at the intersection of a hyperbola pertaining to one transmitter pair with a hyperbola pertaining to another transmitter pair. As is also well known, a mobile receiver can operate in such a system using the signals from just two transmitters providing the mobile receiver is capable of measuring absolute phase, i.e. the receiver incorporates an atomic time standard, such as a local oscillator circuit which is synchronised when the vehicle is stationary at a known geodetic position In practice, local conditions may require signals to be used from more than the theoretical minimum number of transmitters (two with an atomic time standard, three without). The availability of redundant information enables accuracy to be increased as mentioned in U.S. Pat. No. 3,419,865 in the context of an inverse system using fixed receivers and a mobile transmitter. GB Pat. No. 1 321 730 discusses other reasons for employing extra transmitters in an Omega system.

There are many variants of hyperbolic position finding systems including Loran, Decca Navigator and Omega. The present invention is applicable to any of these known systems and is not concerned with the particular nature of the signals transmitted or with the way in which the receiver extracts the position information from the received signals. These matters are very well known in the art at least for the three specific systems mentioned above. The invention may nevertheless be applied in particular to the Omega system for the practical reason that Omega provides worldwide coverage from eight transmitters in Hawaii, North America, Argentina, Norway, Liberia, La Reunion, Japan, and Australia. The principles on which Omega is based are described in U.S. Pat. No. 2,844,816.

The basic frequency of the Omega network is very low (10.2 kHz) and the waves propagate in waveguide mode between the ionosphere and the surface of the earth. The propagation of the VLF signals is affected by such factors as the height of the ionosphere and the surface conductivity and a raw Omega fix has a large margin of error, say $7 \times 1852$ m ($1852$ m$=1$ nautical mile). Although such a fix may be of value on the high seas the need for better accuracy is apparent and some improvement is possible using published tables of corrections which are related to locality and time of day (since the height of the ionosphere varies very much in dependence upon the latter factor). By such means an accuracy in the order of 2 to $5 \times 1852$ m with a 95% probability may be obtained. Even so the system remains suited only to high-seas navigation.

A substantial increase in the accuracy of Omega is obtained by Differential Omega which is in use for example, in French and North West African coastal waters and can reduce the margin or error to the order of hundreds of meters. Each coastal area is served by a fixed receiving station which repeatedly takes fixes, compares these with its known position and transmits correcting data used by the mobile receivers in its area to correct their fixes on the assumption that the error is a simple offset, expressible as an offset in latitude and an offset in longitude measured at the fixed receiving station, which affects all fixes uniformly over the whole area. This is partially true and the accuracy of 95% probability in Differential Omega is $0.2 \times 1852$ m up to $20 \times 1852$ m, $0.3 \times 1852$ m up to $60 \times 1852$ m, $0.5 \times 1852$ m up to $300 \times 1852$ m and $0.9 \times 1852$ m up to $500 \times 1852$ m. In practice the correction may be introduced before calculating latitude and longitude, by phase adjustment within the receiver.

The present invention is concerned with an even more severe problem in accuracy. There has long existed a need for a position finding system which will enable a fleet operator to control a fleet of vehicles effectively on land. Typical examples are police cars and ambulances. There is at present no known system usable for such fleets of vehicles which is both technically acceptable and sufficiently inexpensive to be installed in large numbers of vehicles. There are considerable attractions to use of Omega in that the transmissions are there, anywhere in the world and Omega receivers are available at reasonable cost. However, even with Differential Omega the margin of error over sea is about 300 m at a range of 50 km and increases with range; over land further deterioration in accuracy occurs due to local propagation variations and distortions, for example due to variations in conductivity of the soil and diffraction by topographical and man-made objects.

The accuracy required for locating land vehicles depends on the operator, the environment and the area to be covered. According to a recent report by the U.S. Department of Transport most of the requirements lie in the range 75–300 m.

One approach to increasing accuracy, U.S. Pat. No. 4,232,317, is to record hyperbolic coordinate measurements with a navigation receiver at a large number of points over the operational area and to store these in a computer. The coordinates measured by the vehicle received are transmitted to base and compared with the stored values to determine the nearest value and hence the nearest point to the vehicle. Such a system does not take account of time varying effects, which in Omega are large, and would be prohibitively expensive to apply over a large area. It is therefore an object of the invention to provide an improved system which is capable of an accuracy of, say around 100 m of error and can be applied over a large area at a minimal cost. It is emphasised that the invention is applicable to hyperbolic position finding systems in general; it is not restricted to Omega although Omega is the preferred implementation.

SUMMARY OF THE INVENTION

The basis of the invention is that the phase of the field of radio navigation transmitting stations in an area may be completely described by the azimuth angle of the wavefront relative to a geodetic reference such as grid or true north and the local wavelength. Measurements at three stations situated at known geodetic positions enables the azimuth angles and local wavelength to be determined for any group of the three transmitting stations required for hyperbolic position finding.

BRIEF DESCRIPTION OF THE DRAWINGS

The invention will be described in more detail, by way of example, with reference to the accompanying drawings, in which:

DESCRIPTION OF THE PREFERRED EMBODIMENT

Figure 1:
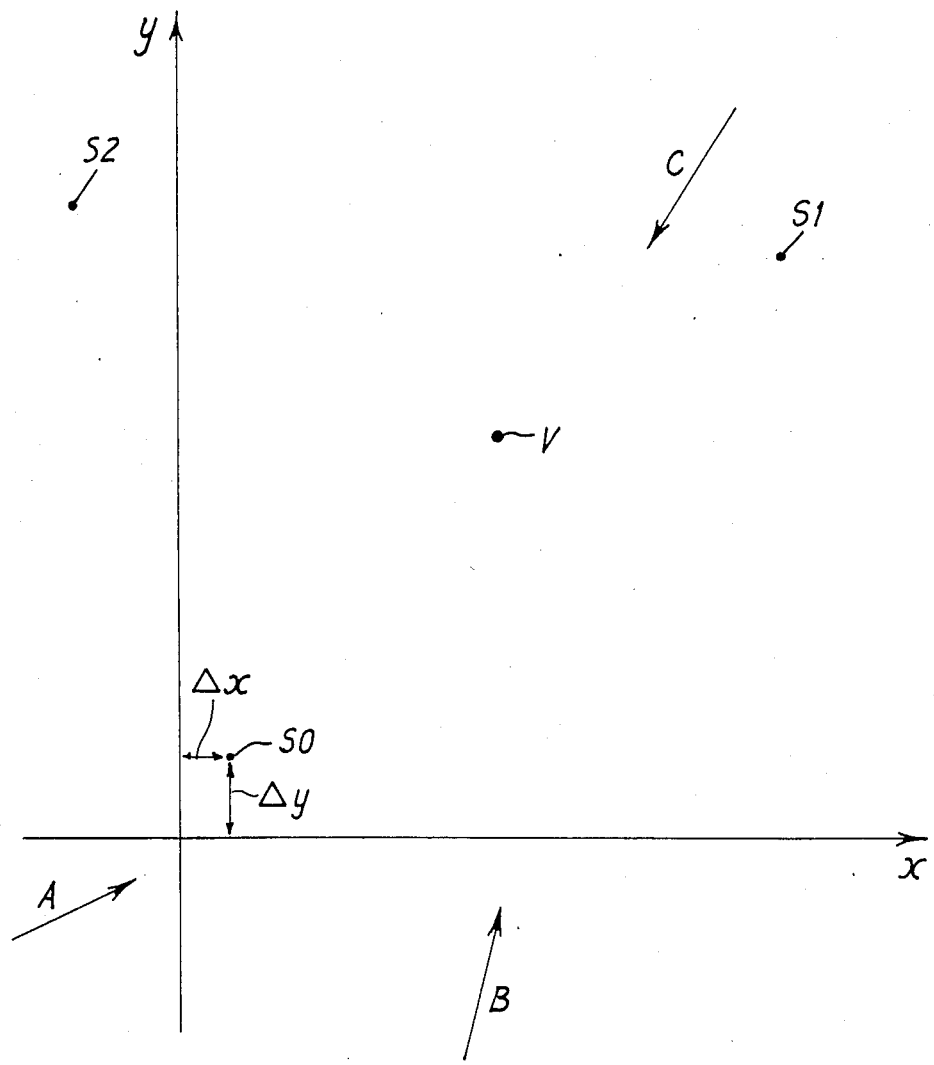
Figure 2:
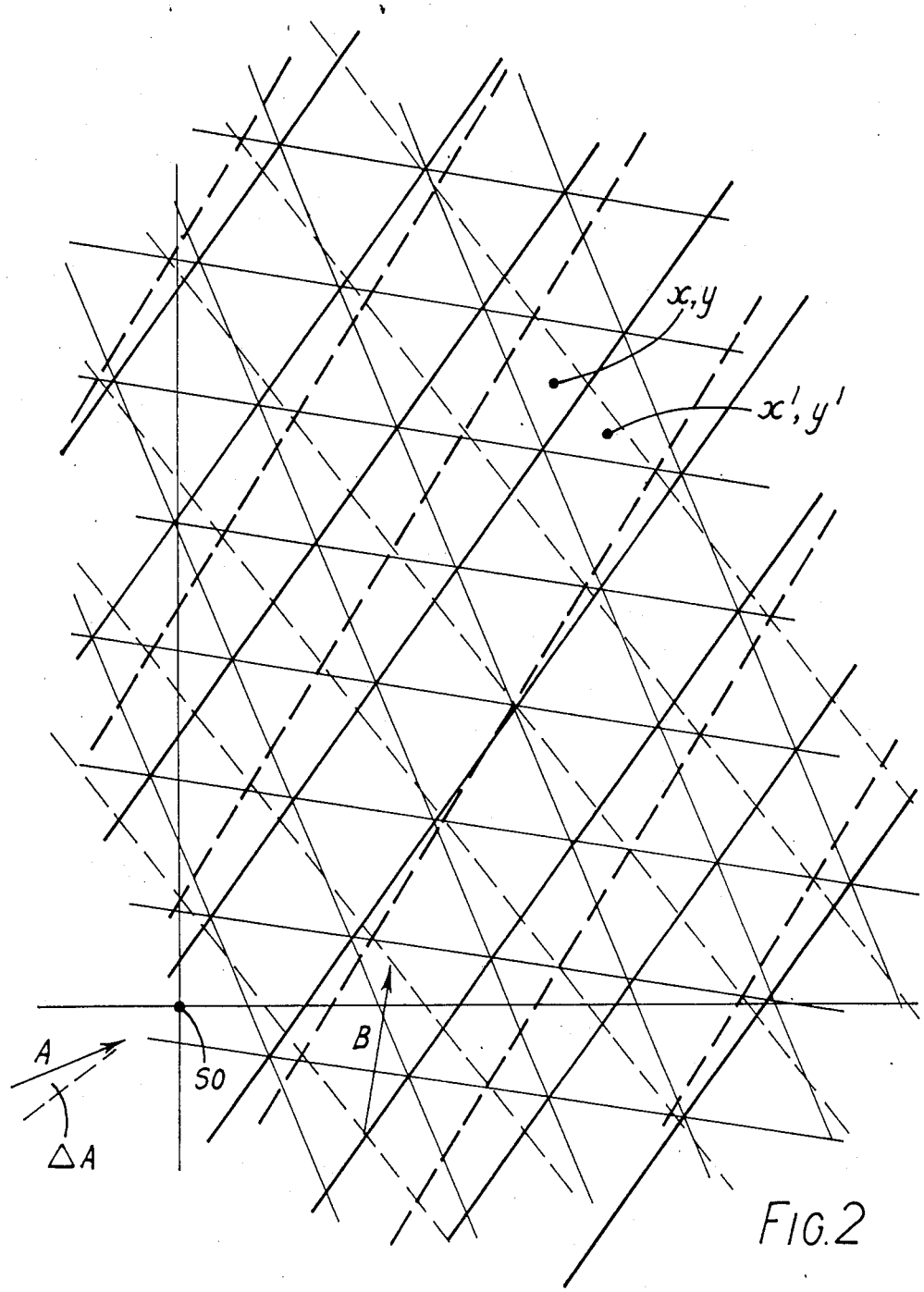
Figure 3:
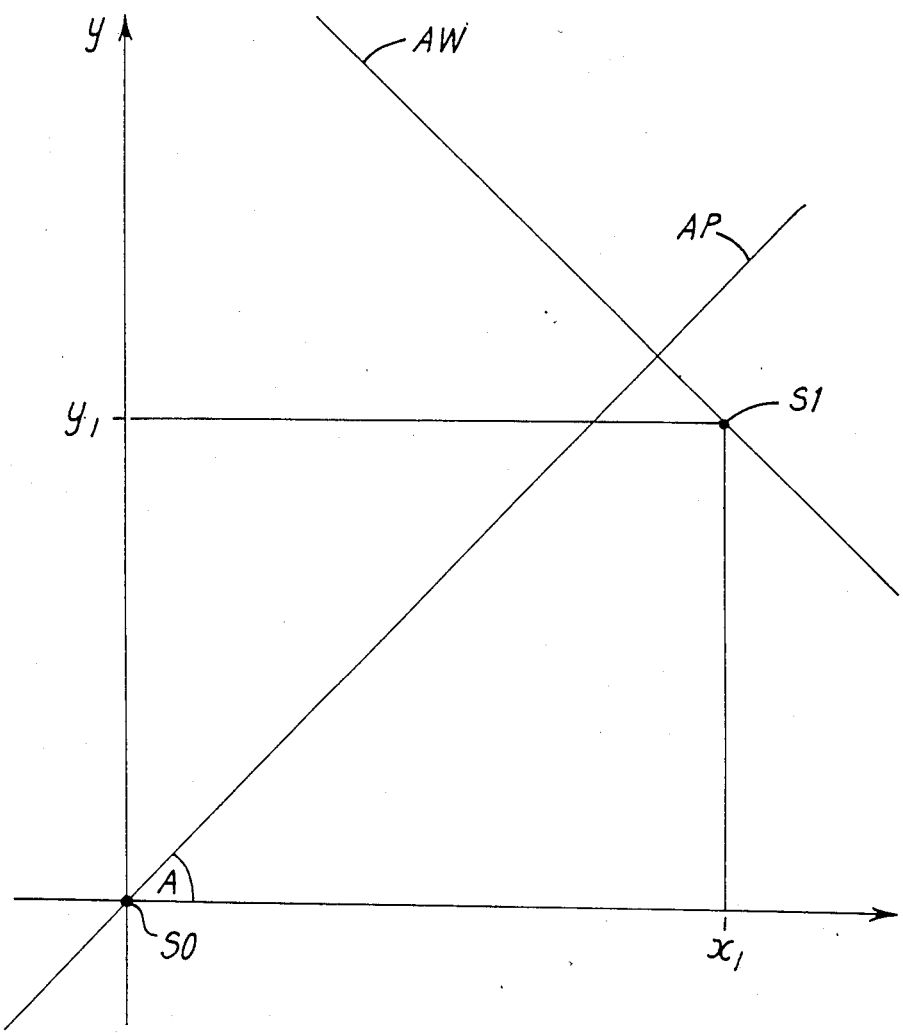
Figure 4:
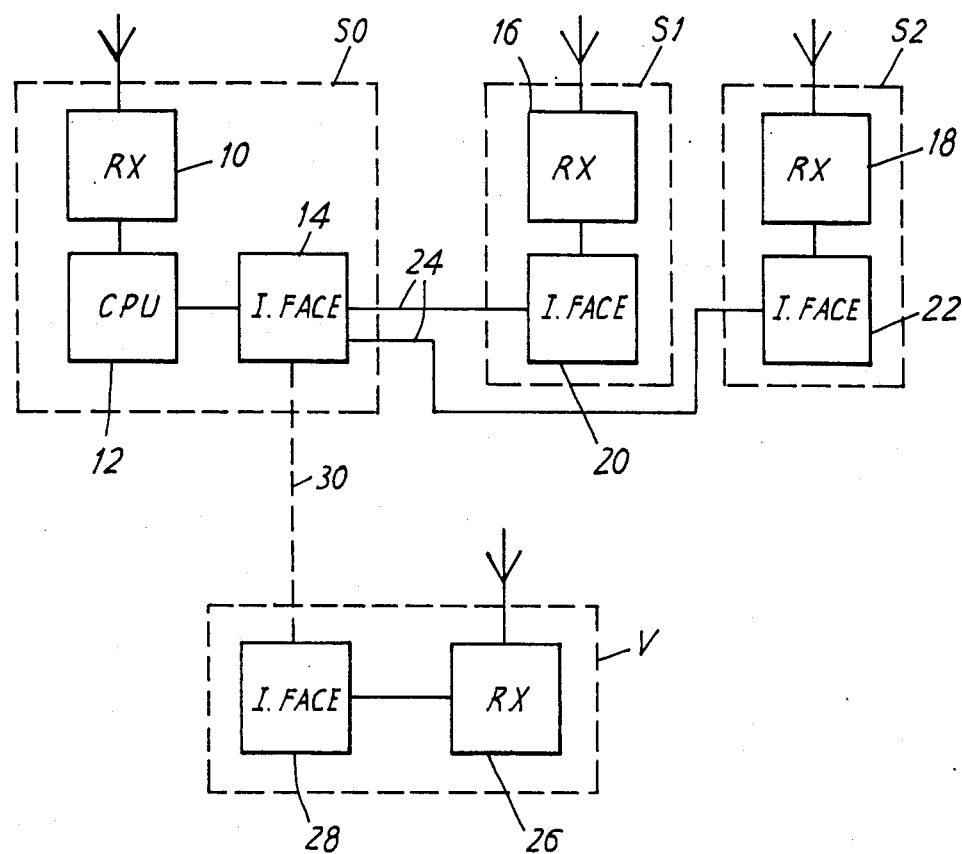

FIG. 1 is a diagrammatic representation of a system according to the invention,

FIGS. 2 and 3 are explanatory diagrams,

FIG. 4 is a block diagram of a system according to the invention.

FIG. 1 shows a system comprising three fixed stations, namely a master station S0 and two subsidiary stations S1 and S2. The station S0 is assumed to be at a control centre constituting the origin of a coordinate system used in determining the positions x, y of vehicles typified by one vehicle V. Each station is equipped with a receiver of known form, e.g. an Omega receiver, adapted to determine its position. In accordance with the known principles of differential Omega, if the master station S0 is found to have a fix position $\Delta x$, $\Delta y$ in the said coordinate system, the standard method is to correct all measured positions by $\Delta x$ and $-\Delta y$. This provides a partial correction only for the following reasons.

The fixes are made, as in all hyperbolic systems, on the basis of the signals coming from three transmitters which will be denoted A, B and C. Correspondingly labelled arrows in FIG. 1 symbolise the direction of the incoming signals.

FIG. 2 illustrates the principle underlying hyperbolic systems in general. Only the A and B signals are considered and their wavefronts are shown by light lines normal to the arrows A and B respectively. Over an area a few tens of kilometers across the wavefronts may be assumed to be straight as may the sections of the hyperbolae which are lines of constant phase difference, shown in heavy lines. The spacing between these lines, i.e. the lane width, is determined by the local wavelength $\lambda$ of the signals.

The propagation distortions affecting the transmitted signals do not merely affect their absolute phase at any point. They also affect $\lambda$ and they alter the angles of the wavefronts. This can easily be seen to arise under conditions in which the height of the ionosphere varies transversely relative to the direction of propagation, or a boundary of different phase velocities is crossed such as that separating areas illuminated by the sun from those that are not, or a sea-land boundary.

Consider now the case in which the B wavefronts preserve their correct angle but in which the A wavefronts are skewed, as indicated in light broken lines. In effect, the A transmitter appears to have its azimuth altered by an angle $\Delta A$. This in turn alters the orientation of the lines of constant phase difference, as shown by heavy broken lines. Therefore a mobile station V which has apparent co-ordinates x, y relative to the origin has true coordinates x', y'. Thus even after corrections have been made in accordance with the known principles of differential Omega, so that the co-ordinate system is correctly referred to $S0=(0, 0)$ measured co-ordinates x, y are in error because of the errors $\Delta A$, $\Delta B$ and $\Delta C$ in the angles of the wavefronts from the transmitters. It is apparent that the correct co-ordinates can be calculated provided $\Delta A$, $\Delta B$ and $\Delta C$ are known. Indeed Omega receivers are known which take the raw phase data and calculate position from the known wavefront angles $A_o$, $B_o$ and $C_o$ at the locality in question and also the value of $\lambda$. In such a case it is merely necessary to apply the corrections $\Delta A$, $\Delta B$ and $\Delta C$ to $A_o$, $B_o$ and $C_o$ before the position calculation is affected.

Thus, to consider only the azimuth A we have $A = A_o + \Delta A$. In practice $\Delta A$ will usually consist of an unvarying component $\Delta A_o$ and a time varying component $\Delta A'$. The latter component has to be determined by continuous monitoring by application of the present invention but the unvarying component $\Delta A_o$, which arises essentially from the loal topography, can be determined and stored in a computer. The above equation becomes $A = A_o + \Delta A_o + \Delta A'$ which can be rewritten $$A = A_o' + \Delta A'.$$

There is considerable advantage in using the corrected value of $A_o$ (i.e. $A_o' = A_o + \Delta A_o$) as it improves the accuracy of calculation of $\Delta A'$ and speeds up the computation if successive approximation techniques are used.

FIG. 3 illustrates the principle upon which the present invention is based. The master station is assumed to be correctly located at the origin i.e. the correction according to differential Omega has been applied. We consider only the wave A. The azimuth A of its direction of propagation is given by $A = A_o + \Delta A$ where A is the angle calculated from the geodetic positions of the A transmitter and the stations S0 and $\Delta A$ is the correction already referred to. We consider also the station S1 with coordinates $x_1$ and $y_1$. The line AP represents the propagation direction while the line AW represents a wavefront through S1. The distance along AP from the origin to the line AW is given by $$x_1 \cos A + y_1 \sin A = x_1 \cos (A_o + \Delta A) + y_1 \sin (A_o + \Delta A) \quad (1)$$

If the phase measurements on the A wave at S0 and S1 are $PA_o$ and $PA_1$ respectively, and if there is a discrepancy between the local clocks at S0 and S1 of $U_{o1}$, then the said distance is also given by $$(PA_1 - PA_o + U_{o1})(\lambda_o + \Delta \lambda) \quad (2)$$

where $\lambda_o$ is the free-space wavelength and $\lambda_o + \Delta \lambda$ is the local wavelength. Equating the expressions (1) and (2) and expanding, we have $$x_1(\cos A_o \cos \Delta A - \sin A_o \sin \Delta A) + y_1(\sin A_o \cos \Delta A + \cos A_o \sin \Delta A) = (PA_1 - PA_o + U_{o1})(\lambda_o + \Delta \lambda) \quad (3)$$

$\Delta A$ may be treated as a small quantity, putting $\cos \Delta A = 1$, $\sin \Delta A = \Delta A$ (in radians). Equation (3) then reduces to $$(x_1 \cos A_o + y_1 \sin A_o) - \Delta A(x_1 \sin A_o - Y_1 \cos A_o) = (PA_1 - PA_o + U_{o1})(\lambda_o + \Delta \lambda) \quad (4)$$

Since $A_o$, $x_1$ and $y_1$ are all known terms, equation (4) may be rewritten $$K'_{A1} - \Delta A . K_{A1} = (PA_1 - PA_o + U_{o1})(\lambda_o + \Delta \lambda) \quad (5),$$

where all K's are constant.

Similarly for the B signal:

$$K'_{B1} - \Delta B \cdot K_{B1} = (PB_1 - PB_o + U_{o1})(\lambda_o + \Delta\lambda) \quad (6)$$

Subtracting equations (5) and (6) we have $$\Delta A \cdot K_{A1} - B \cdot K_{B1} = K'_{A1} - K'_{B1} - [(PA_1 - PB_1) - (PA_o - PB_o)](\lambda_o + \Delta\lambda) \quad (7)$$

$$= K_{AB} - [(PA_1 - PB_1) - (PA_o - PB_o)](\lambda_o + \Delta\lambda) \quad (8)$$

A second, non-redundant equation may be written for station S1, and a third $\omega$ signal C, namely $$\Delta A \cdot K_{A1} - C \cdot K_{C1} - K_{AC} - [(PA_1 - PC_1) - (PA_o - PC_o)](\lambda_o + \Delta\lambda) \quad (9)$$

Two equations may also be written for station S2, of the same form as equations (8) and (9). In these equations the terms are the constants calculable from the geodetically known conditions, the nine measured quantities $PA_o$, $PB_o$, $PC_o$, $PA_1$, $PB_1$, $PC_1$, $PA_2$, $PB_2$, $PC_2$ and four unknowns, $\Delta A$, $\Delta B$, $\Delta C$ and $\Delta\lambda$. The equations are linear simultaneous equations which are readily solvable to determine the four unknowns. $PA_o$ etc. are preferably first corrected to take account of the fixed azimuth errors $\Delta A_o$ etc.

In practice, attention must be given to the question of noise and use may be made of many techniques available for reducing the effect of noise. At the simplest it is possible to average A, etc. over a long period, say 10s where measurements are made at the rate of 100 per second. It may be preferred not to treat $\Delta\lambda$ in this way but either to input a suitable value for $\Delta\lambda$ from a table determine it from previous measurements or calculate it.

FIG. 4 shows a system embodying the invention. The station S0 comprises an Omega receiver 10 and a central data processing unit (CPU) 12 provided with a communications interface 14. The stations S1 and S2 comprise respective Omega receivers 16 and 18 and interfaces 20 and 22. Communications links 24, e.g. landlines or radio communication channels, enable the stations S1 and S2 to transmit their raw data $PA_1, \ldots PC_2$ to the CPU 12 which is programmed to solve the equations as explained above. The CPU therefore stores the correcting quantities $\Delta A$, $\Delta B$, $\Delta C$ and $\Delta\lambda$. In practice, use may be made of more than three of the Omega transmitters and additional correcting quantities $\Delta D$, $\Delta E$ . . . may be calculated and stored.

The mobile station V also comprises an Omega receiver 26 and interface 28 for a communications link 30 with the station S0. This link will be a radio link. The way in which use is made of the correcting terms will depend upon the nature of the fleet of vehicles and where the position information is required. If the information is required at the station S0, e.g. in the case of a fleet of police cars, the link 30 may be used to send the raw Omega data to the station S0. The CPU 12 calculates the vehicle position from this data by firstly applying the differential Omega correction in known way and then by correcting $A_o$, $B_o$ and $C_o$ before applying the Omega calculations to determine x and y for the vehicle. On the other hand, the link 30 may be used to transmit phase correcting information in the normal way for differential Omega, the receiver 26 being a conventional differential Omega receiver which transmits data to the station S0 already corrected to bring S0 to the origin. The corrections to take account of $\Delta A$, $\Delta B$, $\Delta C$ and $\Delta\lambda$ are then made in the CPU 12.

If the vehicle itself needs the position data, the corrections $\Delta A$, $\Delta B$, $\Delta C$ and $\Delta\lambda$ may be transmitted thereto over the link 30. The receiver 26 then has to be adapted to apply these corrections to $A_o$, $B_o$, $C_o$ and $\lambda_o$ before calculating a fix. Operation in this manner will yield even better accuracy for coastal water navigation. To economise in data link capacity it may be desirable to undertake signal processing before transmission in a CPU at stations S1, S2 and V.

For simplicity we have assumed in the above description that the azimuth angles of the transmitters are constant over the area (plane wavefront). The more general solution, taking into account the curvature of the wavefront and any desired level of refinement of the geodetic calculations, will be evident to those knowledgeable in the field and can readily be programmed on modern digital computers and micro-processors. It will also be understood that the measurements made in a local area may be interpreted in terms of a propagation model that includes scattering from particular topographical or man-made features.

Whilst the description applies to hyperbolic navigation in which the local oscillator frequency is unknown, it will be appreciated that if the monitoring stations have a time reference of atomic standard, for example derived by receiving a radiated time standard, (e.g. from the transmitter at Rugby in England), the number of monitoring station could in principle be reduced to two. (The clock discrepancy term $U_{o1}$ drops out of equations (5) and (6) above).

Local conditions however may require more than the theoretical minimum of two with an atomic time standard, or three for the hyperbolic mode. The number and the location of the monitoring stations and the selection of the control station will be made so as to minimise errors.

We claim:

1. In a position finding system of the type in which synchronized radio signals are transmitted from a plurality of transmitters stationed at known geodetic positions, to enable the position of mobile receivers to be determined from the phases of signals received from a plurality of transmitters, the improvement comprising:
   a plurality of geographically separated fixed receiving stations having known geodetic positions,
   calculating means at a common station for receiving phase information from all of the fixed receiving stations and for calculating therefrom the apparent geodetic azimuths of the transmitters corresponding to the wavefront directions at the fixed receiving stations, and
   means for calculating azimuth corrections from the differences between true and apparent geodetic azimuths.

2. The improvement according to claim 1, characterised by means responsive to data from the fixed receiving stations indicative of their measured positions to calculate corrections for the deviation of the local radio signal wavelength from the free space wavelength.

3. The improvement according to claim 2, characterised in that the deviation of the local wavelength from the free space wavelength is determined from previous measurements.

4. The improvement according to claim 2, characterised in that the deviation of the local wavelength from the free space wavelength is calculated.

5. The improvement according to claim 1, further comprising a mobile receiving station and means for employing the said corrections to correct position measurements of the mobile station.

6. The improvement according to claim 5, characterised in that the corrections are transmitted to the mobile station which has a receiver equipped to apply the corrections to the geodetic azimuths.

7. The improvement according to claim 5, characterised in that the corrections are calculated at one of the fixed stations, the mobile station transmits uncorrected data to the one fixed station and the one fixed station calculates the position of the mobile station subject to the corrections.

8. The improvement according to claim 7, characterised in that the mobile station is a land vehicle.

9. The improvement according to claim 7, characterised in that the mobile station is a marine vehicle.

10. The improvement according to claim 7, characterised in that the mobile station is an airborne vehicle.

11. The improvement according to claim 1, characterised in that the data is processed prior to transmission.

12. The improvement according to claim 1 wherein the position of mobile receivers is determined by determining absolute phase of signals received from at least two transmitters.

13. The improvement according to claim 1 wherein the position of mobile receivers is determined by determining the relative times of arrival of signals received from pairs of at least three transmitters.

14. The improvement according to claim 1 wherein the position of mobile receivers is determined by determining relative phases of signals received from pairs of at least three transmitters.

* * * * *